US011515668B2

(12) United States Patent
Lv et al.

(10) Patent No.: US 11,515,668 B2
(45) Date of Patent: Nov. 29, 2022

(54) ALIGNMENT MECHANISM, CHARGING DEVICE AND CHARGING SYSTEM FOR AUTOMATIC CHARGING

(71) Applicant: HANGZHOU HIKROBOT CO., LTD., Zhejiang (CN)

(72) Inventors: Wangbiao Lv, Zhejiang (CN); Hao Liu, Zhejiang (CN)

(73) Assignee: Hangzhou Hikrobot Co., Ltd., Zhejiang (CN)

( * ) Notice: Subject to any disclaimer, the term of this patent is extended or adjusted under 35 U.S.C. 154(b) by 296 days.

(21) Appl. No.: 16/631,997

(22) PCT Filed: Jun. 15, 2018

(86) PCT No.: PCT/CN2018/091495
§ 371 (c)(1),
(2) Date: Jan. 17, 2020

(87) PCT Pub. No.: WO2019/015424
PCT Pub. Date: Jan. 24, 2019

(65) Prior Publication Data
US 2020/0235522 A1    Jul. 23, 2020

(30) Foreign Application Priority Data

Jul. 19, 2017 (CN) .......................... 201710591558.5
Jul. 19, 2017 (CN) .......................... 201720879388.6
Jul. 19, 2017 (CN) .......................... 201720879390.3

(51) Int. Cl.
*H02J 50/90*    (2016.01)
*H01R 13/631*    (2006.01)
(Continued)

(52) U.S. Cl.
CPC ............ *H01R 13/631* (2013.01); *B60L 53/16* (2019.02); *B60L 53/35* (2019.02); *B60L 53/60* (2019.02);
(Continued)

(58) Field of Classification Search
CPC .......... B60L 53/14; B60L 53/16; B60L 53/30; B60L 53/35; B60L 53/60; H01R 13/631;
(Continued)

(56) References Cited

U.S. PATENT DOCUMENTS 5,850,135 A * 12/1998 Kuki ...................... B60L 50/52
                                                     320/108
10,661,669 B1 * 5/2020 Torok ...................... B60L 53/16
(Continued)

FOREIGN PATENT DOCUMENTS

CN    102904307 A    1/2013
CN    103441376 A    12/2013
(Continued)

OTHER PUBLICATIONS

Extended European search report of counterpart EP application No. 18835769.3—8 pages (Jul. 6, 2020).
(Continued)

*Primary Examiner* — Levi Gannon
(74) *Attorney, Agent, or Firm* — Knobbe, Martens, Olson & Martens, LLC

(57) ABSTRACT

An alignment mechanism for automatic charging, comprising: a first substrate, disposed in a vertical direction; a second substrate, disposed opposite to the first substrate; a first spring, both ends connected to surfaces of the first substrate and the second substrate which face each other, respectively; and a limiting assembly, disposed between the first substrate and the second substrate; wherein the limiting assembly comprises at least two limiting plates which are
(Continued)

disposed parallel to each other and are in a same horizontal plane, and each of the two limiting plates has both ends connected to the first substrate and the second substrate respectively in such a manner that the limiting plate is rotatable in the horizontal plane; and a surface of the second substrate facing away from the first substrate is configured to connect a first connector, which is a connector of a charging device to be charged.

19 Claims, 5 Drawing Sheets

(51) Int. Cl.
*B60L 53/60* (2019.01)
*B60L 53/16* (2019.01)
*G05D 1/08* (2006.01)
*H01R 13/66* (2006.01)
*B60L 53/35* (2019.01)

(52) U.S. Cl.
CPC ............... *G05D 1/08* (2013.01); *H01R 13/66* (2013.01); *H02J 50/90* (2016.02)

(58) Field of Classification Search
CPC ...... H01R 13/66; H02J 7/0027; H02J 7/0042; H02J 50/90; Y02T 90/12
See application file for complete search history.

(56) References Cited

U.S. PATENT DOCUMENTS

| | | | |
|---|---|---|---|
| 2008/0220636 A1 | 9/2008 | Champion et al. | |
| 2013/0076902 A1* | 3/2013 | Gao | ........................ B60L 53/35 |
| | | | 348/148 |
| 2021/0138919 A1* | 5/2021 | Weber | ................ H01R 13/6205 |

FOREIGN PATENT DOCUMENTS

| | | |
|---|---|---|
| CN | 206322938 U | 7/2017 |
| CN | 207000207 U | 2/2018 |
| CN | 207000208 U | 2/2018 |
| JP | 2009027851 A | 2/2009 |
| WO | 2016201901 A1 | 12/2016 |
| WO | 2016201902 A1 | 12/2016 |

OTHER PUBLICATIONS

International search report in PCT application No. PCT/CN2018/091495 dated Aug. 21, 2018.

* cited by examiner

ALIGNMENT MECHANISM, CHARGING DEVICE AND CHARGING SYSTEM FOR AUTOMATIC CHARGING

CROSS-REFERENCE TO RELATED APPLICATION

This application claims priority to Chinese Patent Applications No. 201710591558.5, No. 201720879390.3 and No. 201720879388.6 both filed with the China National Intellectual Property Administration on Jul. 19, 2017 and entitled "ALIGNMENT MECHANISM, CHARGING DEVICE, AND CHARGING SYSTEM FOR AUTOMATIC CHARGING", the entire contents of which are incorporated herein by reference.

TECHNICAL FIELD

Embodiments of the present disclosure relate to an alignment mechanism, a charging device and a charging system for automatic charging.

BACKGROUND

An automated guided vehicle (AGV) is a driverless vehicle, which is equipped with an electrically, magnetically or optically automated guided apparatus, may travel along a predetermined guiding path, and has a safety protection function and various transportation functions. A rechargeable battery is adopted in the AGV as a power source and the battery is charged in an automatic charging manner. When the battery needs to be charged, the AGV retreats to approach the charging device, such that a connector disposed at the tail of the AGV is docked into the connector of the charging device to charge the AGV. In general, the charging device is with an alignment mechanism to facilitate the docking of the connector of the AGV into the connector of the charging device.

SUMMARY

Various embodiments of the present disclosure provide an alignment mechanism for automatic charging, the alignment mechanism includes:
 a first substrate disposed in a vertical direction;
 a second substrate disposed opposite to the first substrate;
 a first spring, both ends connected to surfaces of the first substrate and the second substrate which face each other, respectively; and
 a limiting assembly, disposed between the first substrate and the second substrate;
 wherein the limiting assembly comprises at least two limiting plates (4) which are disposed parallel to each other and are in a same horizontal plane, and each of the two limiting plates has both ends that are connected to the surfaces of the first substrate (2) and the second substrate (5) which face each other respectively in such a manner that the limiting plate is rotatable in the horizontal plane thereof; and
 a surface of the second substrate (5) facing away from the first substrate (2) is configured to connect a first connector, the first connector being a connector of a charging device to be charged.

In some embodiments of the present disclosure, the alignment mechanism further includes:
 a first connecting plate and a second connecting plate which are disposed on the surfaces of the first substrate and the second substrate which face each other respectively, wherein the first connecting plate and the second connecting plate are positioned in the same horizontal plane; and
 both ends of each of the limiting plates are connected to the first connecting plate and the second connecting plate by a first pin and a second pin respectively.

In some embodiments of the present disclosure, the first connecting plate and the second connecting plate are both provided with mounting holes; both ends of the limiting plates are also provided with mounting holes;
 each of the first pins sequentially passes through the mounting hole in the first connecting plate and the mounting hole at one end of the limiting plate to connect the limiting plate to the first connecting plate; and
 each of the second pins sequentially passes through the mounting hole in the second connecting plate and the mounting hole at the other end of the limiting plate to connect the limiting plate to the second connecting plate.

In some embodiments of the present disclosure, the mounting hole at at least one of the two ends of the limiting plate is an oblong hole, which includes two arc portions opposite to each other and a linear portion connecting the two arc portions, and a lengthwise direction of the oblong hole being in a front-rear direction; and
 the first pin and/or the second pin is movable in the lengthwise direction of the oblong hole.

In some embodiments of the present disclosure, a length of the first pins outside the mounting hole of the first connecting plate is greater than a thickness of the limiting plate; and
 a length of the second pins outside the mounting hole of the second connecting plate is greater than the thickness of the limiting plate.

In some embodiments of the present disclosure, the alignment mechanism is with at least two sets of the limiting assemblies that are arranged in a vertical direction.

In some embodiments of the present disclosure, the alignment mechanism further includes:
 a third substrate disposed opposite to the second substrate, wherein the third substrate is positioned on a side of the second substrate facing away from the first substrate; the third substrate has a surface that faces away from the second substrate and is configured to connect the first connector; and
 the third substrate is connected to the second substrate in such a manner that the third substrate is able to move laterally relative to the second substrate.

In some embodiments of the present disclosure, the alignment mechanism further includes:
 a slide rail is on one of two opposite surfaces of the second substrate and the third substrate, wherein the lengthwise direction of the slide rail is in a lateral direction; and
 a slider is on the other of the two opposite surfaces of the third substrate and the second substrate and mated with the slide rail.

In some embodiments of the present disclosure, the slide rail is on the second substrate, and the slider is on the third substrate.

In some embodiments of the present disclosure, a dimension of the third substrate in the lateral direction is less than a dimension of the second substrate in the lateral direction.

The alignment mechanism further includes:
 a connecting member fixed to each of left and right sides of the surface of the second substrate facing away from the first substrate respectively, and two second springs positioned at each of left and right sides of the third substrate respectively, wherein one end of each of the two second springs is connected to the corresponding connecting member, and an other end thereof is connected to the third substrate.

In some embodiments of the present disclosure, the connecting member is with a through hole, wherein an axial direction of the through hole is in a lateral direction; and the alignment mechanism further includes: a second connecting rod, wherein one end of the second connecting rod passes through the through hole in the corresponding connecting member and is connected to the third substrate, and the second connecting rod is movable in the axial direction of the through holes; and the second spring is sleeved on the second connecting rod.

In some embodiments of the present disclosure, the alignment mechanism further includes: a guiding arm; wherein a lengthwise direction of the guiding arm is in a front-rear direction, a rear end of the guiding arm is connected to the surface of the second substrate facing away from the first substrate, and a front end of the guiding arm is configured to connect the first connector.

In some embodiments of the present disclosure, the alignment mechanism further includes: a guiding arm, wherein a lengthwise direction of the guiding arm is in a front-rear direction, a rear end of the guiding arm is connected to the surface of the third substrate facing away from the second substrate, and a front end of the guiding arm is configured to connect the first connector.

In some embodiments of the present disclosure, the alignment mechanism further includes:

a first guiding block is on an upper surface of the guiding arm proximal to the front end of the guiding arm, and a second guiding block 132 is on a lower surface of the guiding arm and corresponding to the position of the guiding block, wherein an upper surface of the first guiding block includes a beveled segment and a planar segment that are sequentially connected from front to back, the beveled segment of the first guiding block inclining upwards; and a lower surface of the second guiding block includes a beveled segment and a planar segment that are sequentially connected from front to back, the beveled segment of the second guide block inclining downwards.

In some embodiments of the present disclosure, the alignment mechanism further includes:

a first disc and a second disc that are on left and right sides of the front end of the guiding arm respectively, wherein the first disc and the second disc are horizontally;

a leftmost edge of the first disc protrudes outwards relative to a leftmost edge of the guiding arm; and a rightmost edge of the second disc protrudes outwards relative to the rightmost edge of the guiding arm.

In some embodiments of the present disclosure, the alignment mechanism further includes:

a fourth substrate fixed to the surface of the first substrate facing away from the second substrate.

In some embodiments of the present disclosure, the alignment mechanism further includes: a universal ball is below the second substrate.

Various embodiments of the present disclosure provides a charging device for automatic charging, the charging device includes: an alignment mechanism and a first connector connected to the alignment mechanism.

The alignment mechanism is the one provided in accordance with the first aspect of the present disclosure.

Various embodiments of the present disclosure provides a charging system for automatic charging, the charging system includes: an alignment mechanism disposed in a charging device, a first connector connected to the alignment mechanism, and a second connector is on an automated guided vehicle and mated with the first connector;

wherein the alignment mechanism is the one provided in accordance with the first aspect of the present disclosure.

BRIEF DESCRIPTION OF THE DRAWINGS

For clearer descriptions of the technical solutions in the embodiments of the present disclosure, the following briefly introduces the accompanying drawings required for describing the embodiments.

Figure 1:
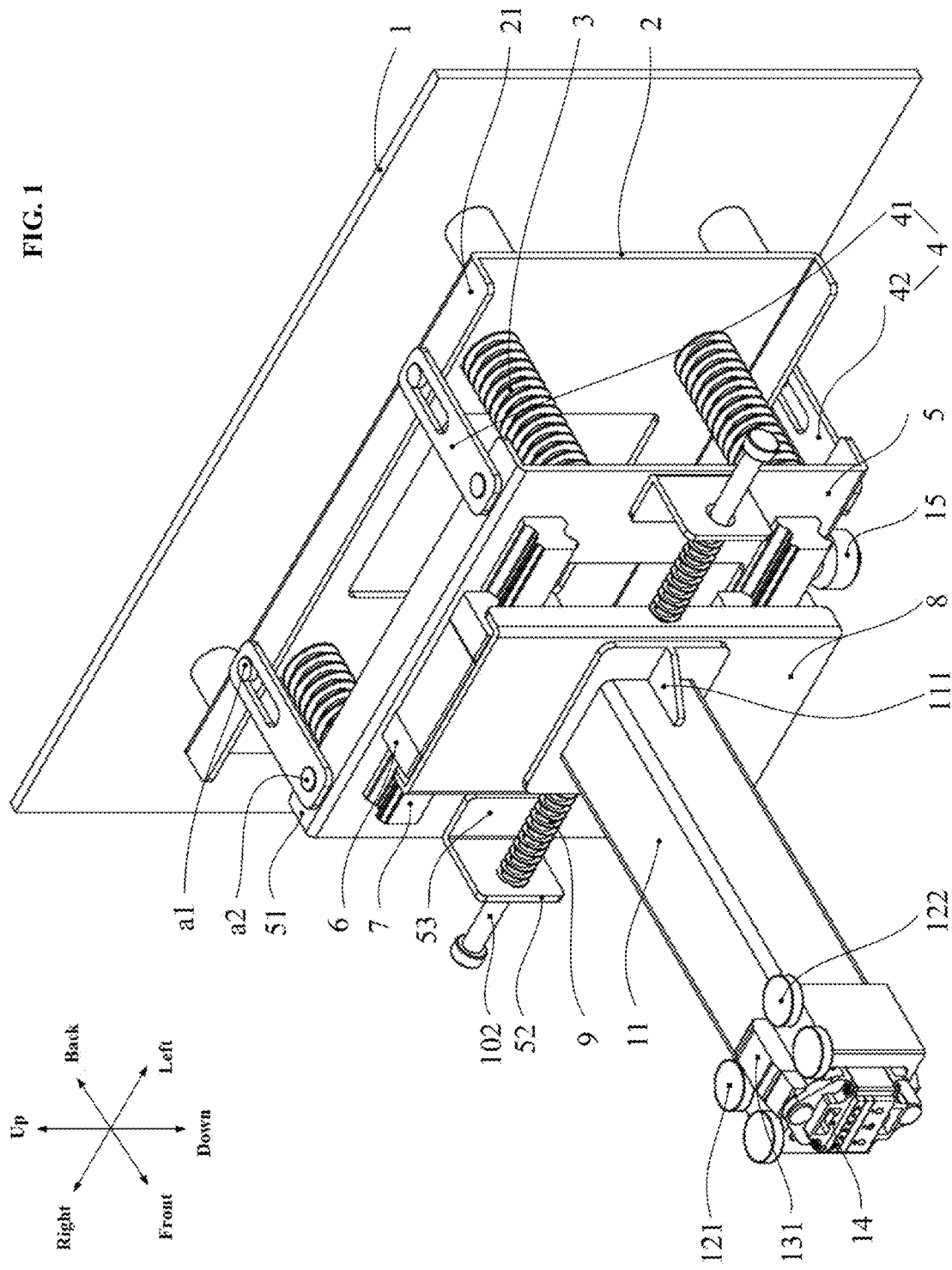
FIG. 1 illustrates a schematic perspective structure of an alignment mechanism for automatic charging in accordance with the present disclosure.

Reference signs in the drawings indicate the following respectively:

| | |
|---|---|
| 1-fourth substrate; | 2-first substrate; |
| 21-first connecting plate; | 3-first spring; |
| 4-limiting plate; | 41-first limiting plate; |
| 42-second limiting plate; | 5-second substrate; |
| 51-second connecting plate; | 52-third connecting plate; |
| 53-fourth connecting plate; | 6-slider; |
| 7-slide rail; | 8-third substrate; |
| 9-second spring; | 101-first connecting rod; |
| 102-second connecting rod; | 103-third connecting rod; |
| 11-guiding arm; | 111-ribbed plate; |
| 121-first disc; | 122-second disc; |
| 131-first guiding block; | 1311- beveled segment of first guiding block; |
| 1312-planar segment of first guiding block; | 132-second guiding block; |
| 1321-beveled segment of second guiding block; | 1322 - planar segment of second guiding block; |
| 14-first connector; | 15-universal ball; |
| 16-guiding barrel; | 161-upwards inclined surface of guiding barrel; |

| | |
|---|---|
| 162-leftwards inclined surface of guiding barrel; | 163-downwards inclined surface of guiding barrel; |
| 164-rightwards inclined surface of guiding barrel; | 17-second connector; |
| a1- first pin; | a2-second pin. |

DETAILED DESCRIPTION

The embodiments of the present disclosure are described in further detail hereinafter with reference to the accompanying drawings, to present the objects, technical solutions, and advantages of the present disclosure more clearly. Unless otherwise defined, all technical terms used in the present disclosure have the same meanings as commonly understood by a person of ordinary skill in the art.

At present, the alignment mechanism in the charging device includes a substrate and a spring. The substrate is disposed in a vertical direction; and one end of the spring is fixed to the substrate, and the other end of the spring is fixed to the connector of the charging device. During the docking of the connector of the AGV into the connector of the charging device, the spring is compressed, and a positional deviation between the connector of the AGV and the connector of the charging device is eliminated by an acting force from the spring, such that the connector of the AGV is docked into the charging device.

A conventional alignment mechanism may only eliminate the positional deviation between the connector of the AGV and the connector of the charging device in a front-rear direction. However, due to control precision and other reasons, the connector of the AGV and the connector of the charging device may be also subject to positional deviations in other directions, especially in a lateral direction. When the connector of the AGV and the connector of the charging device are subject to a positional deviation in other directions, it is necessary to adjust the position of the AGV repeatedly such that the AGV is adapted to the position of the charging device for the sake of completing the engagement of the connector of the AGV with the connector of the charging device, thereby leading to low efficiency in the AGV automatic charging.

For clearer and more concise descriptions of the technical solutions of the present disclosure, in the process of docking a connector of an AGV into a connector of a charging device in the present disclosure, a direction parallel to a traveling direction of the AGV is set as a front-rear direction, a direction positioned in the horizontal plane and perpendicular to the traveling direction above is set as a lateral direction, and a direction positioned in a vertical plane and perpendicular to the traveling direction above is set as an up-down direction. The definition of the directions above is not intended to limit the present disclosure.

Figure 2:
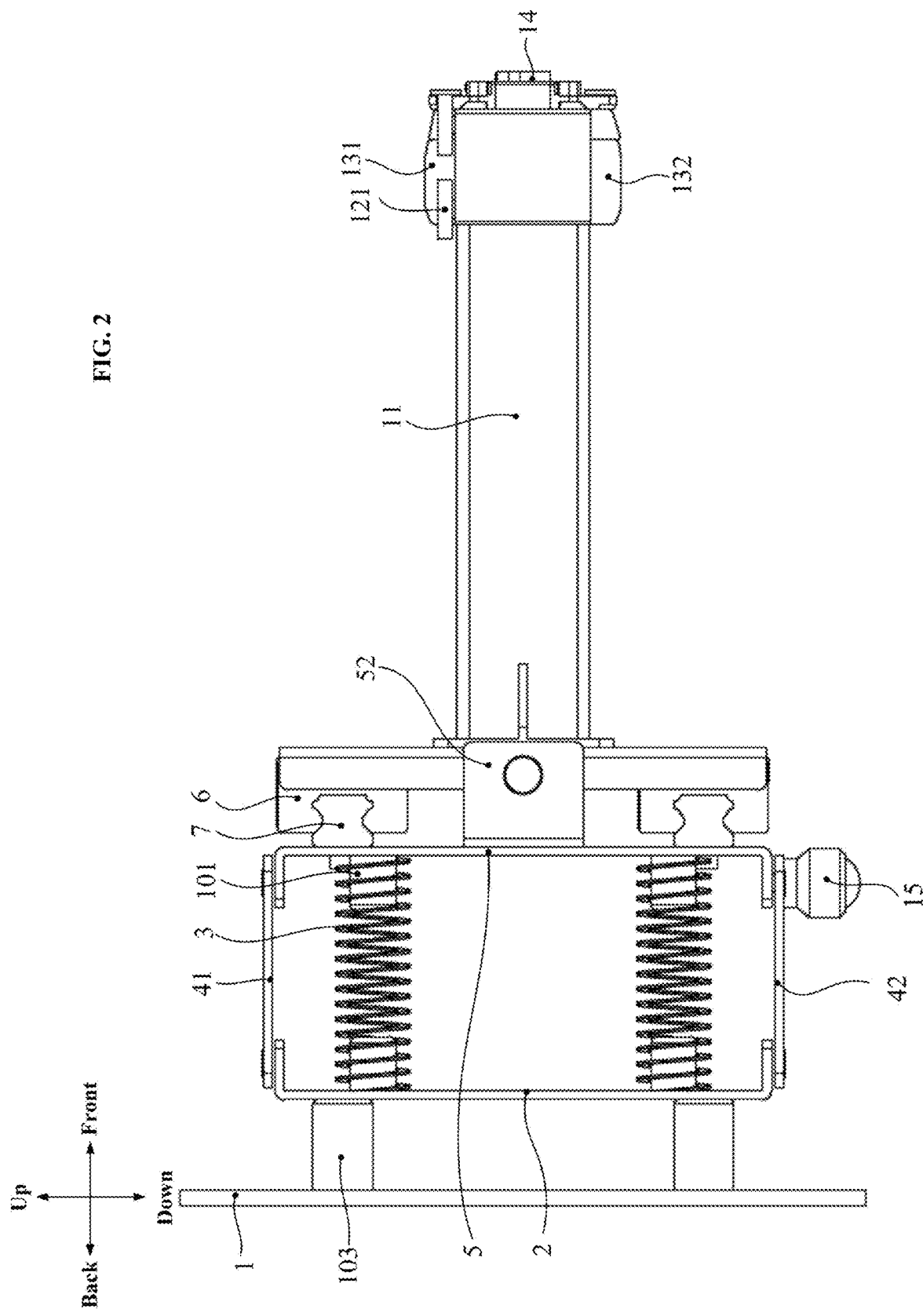
FIG. 2 illustrates a schematic planar structure of an alignment mechanism for automatic charging in accordance with the present disclosure.

Next, the alignment mechanism for automatic charging according to the present disclosure will be described in detail with reference to the accompanying drawings. FIG. 1 illustrates a schematic perspective structure of the alignment mechanism in accordance with the present embodiment, and FIG. 2 is a schematic planar structure of the alignment mechanism in accordance with the present embodiment. As illustrated in FIG. 1 and FIG. 2, the alignment mechanism includes:

a first substrate 2 disposed in a vertical direction;
a second substrate 5 disposed opposite to the first substrate 2:

a first spring 3, both ends of which connected to surfaces of the first substrate 2 and the second substrate 5 which face each other, respectively; and a limiting assembly, disposed between the first substrate 2 and the second substrate 5.

The limiting assembly includes at least two limiting plates 4 which are disposed parallel to each other and positioned in the same horizontal plane, and each of the two limiting plates has both ends that are connected to the surfaces of the first substrate 2 and the second substrate 5 which face each other respectively in such a manner that the limiting plate is rotatable in the horizontal plane thereof.

The surface of the second substrate 5 facing away from the first substrate 2 is configured to connect a first connector, which is a connector of a charging device to be charged.

In the alignment mechanism in accordance with the present disclosure, the first substrate 2 and the second substrate 5 are disposed opposite to each other, and at least two limiting plates 4 that are disposed parallel to each other and positioned in the same horizontal plane are disposed between the first substrate 2 and the second substrate 5. Both ends of each of the limiting plates are connected to the surfaces of the first substrate 2 and the second substrate 5 which face each other respectively in such a manner that the limiting plate is rotatable in the horizontal plane thereof. Therefore, the surfaces of the first substrate 2 and the second substrate 5 which face each other, as well as any two limiting plates 4, may form an approximately parallelogram structure having four movable apexes. Based on the structural characteristics of the parallelogram, when the second substrate 5 is subject to an external force, the second substrate 5 will move in the lateral direction relative to the first substrate 2 when an external force is acted on the second substrate 5, and meanwhile, the relative position between the second substrate 5 and the first substrate 2 may also be changed.

Based on the description above, during practical application, the alignment mechanism according to the present embodiment is disposed in the charging device, the first substrate is fixed to the charging device, and the connector of the charging device is connected to the second substrate; and when a deviation in the lateral direction is present between the connector of the AGV and the connector of the charging device during docking, an interaction force between the connector of the AGV and the connector of the charging device causes the second substrate to move towards laterally, thereby driving the connector of the charging device to move laterally and further eliminating the positional deviation between the connector of the AGV and the connector of the charging device in the lateral direction. Meanwhile, under cooperation of the first spring 3 which is disposed between the first substrate 2 and the second substrate 5, the connector of the AGV and the connector of the charging device may be adjusted in the positional relationship in the front-rear direction, thereby eliminating the positional deviation in the front-rear direction.

The first spring 3 can further absorb an impact resulting from docking the connector of the AGV into the connector of the charging device during docking; and when the charging is completed, the second substrate 5 may be reset under the restoring force of the first spring 3 after the AGV leaves from the charging device.

For the specific practice of the connection of the above-mentioned limiting plates with the first substrate 2 and the second substrate 5, this embodiment provides the following optional technical solutions:

As illustrated in FIG. 1 and FIG. 2, the alignment mechanism according to this embodiment further includes: a first connecting plate 21 and a second connecting plate 51, which are disposed on the surfaces of the first substrate 2 and the second substrate 5 which face each respectively; wherein the first connecting plate 21 and the second connecting plate 51 are positioned in the same horizontal plane, each of the limiting plate 4 has one end connected to the first connecting plate 21 through a first pin a1, and the other end connected to the second connecting plate 51 through a second pin a2.

Since the first connecting plate 21 and the second connecting plate 51 are positioned in the same horizontal plane, all the limiting plates 4 may be positioned in the same horizontal plane after the limiting plates 4 are connected to the first connecting plate 21 and the second connecting plate 51. Through pin connection, both ends of each of the limiting plates 4 may rotate with the pin as a center of rotation.

In this embodiment, the first connecting plate 21 and the second connecting plate 51 are both provided with mounting holes; both ends of the limiting plates 4 are also provided with mounting holes; each of the first pins a1 sequentially passes through the mounting hole in the first connecting plate 21 and the mounting hole at one end of the limiting plate 4 to connect one end of the limiting plate 4 to the first connecting plate 21; and each of the second pins a2 sequentially passes through the mounting hole in the second connecting plate 51 and the mounting hole at the other end of the limiting plate 4 to connect the other end the limiting plate 4 to the second connecting plate 51. It may be understood that the axes of the first pins a1 and second pins a2 are disposed in the vertical direction, and the first pins a1 and the second pins a2 are in clearance fit with the corresponding mounting holes.

Further, in the process of docking the connector of the AGV into the connector of the charging device, an angular deviation may be present in addition to the positional deviation in the front-rear direction and the lateral direction. In the case where a positional deviation is only present in the front-rear direction and the lateral direction, the section of the connector of the AGV in the vertical direction is parallel to the section of the connector of the charging device in the vertical direction; but for the case where an angular deviation is present, an angle is defined between the cross section of the connector of the AGV in the vertical direction and the cross section of the connector of the charging device in the vertical direction.

Regarding the angular deviation above, in the alignment mechanism in accordance with the present disclosure, the mounting hole at at least one of the two ends of the limiting plate 4 is an oblong hole. As illustrated in FIG. 1, the oblong hole includes two arc portions disposed opposite to each other and a linear portion connecting the two arc portions, and a lengthwise direction of the oblong hole is disposed in a front-rear direction. For example, the mounting hole in one end of each of the limiting plates 4 connected to the first connecting plate 21 may be configured as an oblong hole, and the mounting hole at one end connected to the second connecting plate 51 may be configured as a common circular hole; and the mounting holes at both ends of the limiting plates 4 may also be configured as oblong holes. The first pins a1 are movable in the lengthwise direction of the oblong holes, or the second pins a2 are movable in the lengthwise direction of the oblong holes, or both the first pin a1 and the second pin a2 are movable in the lengthwise direction of the oblong holes. By configuring the mounting hole at at least one end of each of the limiting plate 4 as the oblong hole, the second substrate 5 may incline relative to the first substrate 2, thereby driving the connector of the charging device to incline accordingly, such that the angular deviation is eliminated to complete the engagement of the connectors.

Further, a positional deviation is also present in the up-down direction during the docking of the connector of the AGV into the connector of the charging device. In this embodiment, the positional deviation in the up-down direction may be eliminated as follows: a length of the first pins a1 outside the mounting hole of the first connecting plate 21 is greater than a thickness of the limiting plate 4; and a length of the second pins a2 outside the mounting hole of the second connecting plate 51 is greater than the thickness of the limiting plate 4.

It may be understood that when the first pins a1 connect the first connecting plate 21 and the limiting plate 4, a portion of each of the first pins a1 in the lengthwise direction is positioned in the mounting hole of the first connecting plate 21, and the limiting plate 4 is sleeved on the first pin at a portion outside the mounting hole of the first connecting plate 21; and when a length of the portion of each of the first pins a1 outside the mounting hole of the first connecting plate 21 is greater than the thickness of the limiting plate 4, the first connecting plate 21 is movable in an axial direction (i.e. the up-down direction) of the first pin axis a1. Similarly, the second connecting plate 51 is movable in an axial direction (i.e., the up-down direction) of the second pin a2. When the first connecting plate 21 or the second connecting plate 51 moves upwards and downwards, the limiting plates 4 may also move upwards and downwards. In this way, when the connector of the AGV and the connector of the charging device are subject to a positional deviation in the up-down direction, an interaction force in the up-down direction is generated in the docking process, and causes the second substrate 5 to move upwards or downwards correspondingly relative to the first substrate 2, thereby driving the connector of the charging device to move upwards or downwards to eliminate the positional deviation in the up-down direction.

In the alignment mechanism according to this embodiment, at least two sets (for example, two sets, three sets, or four sets) of the limiting assemblies may be provided, and at least two sets of the limiting assemblies are arranged in the vertical direction (i.e., the up-down direction). Correspondingly, the number of first connecting plates 21 and second connecting plates 51 is also at least 2 respectively. The first connecting plate 21 may be integrally formed with the first substrate 2, and the second connecting plate 51 may be integrally formed with the second substrate 5.

The number of limiting plates 4 in each set of the limiting assembly may be 2, 3, 4 and the like, which is not specifically limited in this embodiment. The number of limiting plates 4 in each set of the limiting assembly may be the same or different.

In the alignment mechanism according to this embodiment, the number of first springs 3 is not specifically limited, and may be 1, or 2 or more, for example, 3, 4, 5, 6, and the like. When one first spring 3 is provided, both ends of the first spring 3 may be connected to the centers of the surfaces of the first substrate 2 and the second substrate 5 which face each other respectively.

In this embodiment, both ends of the first spring 3 may be connected to the surfaces of the first substrate 2 and the second substrate 5 which face each other by soldering, or may be connected to the first substrate 2 and the second substrate 5 in an embedded manner by forming slots in the surfaces of the first substrate 2 and the second substrate 5 which face each other. The surfaces of the first substrate 2 and the second substrate 5 which face each other may also be provided with a first connecting rod 101 respectively. By sleeving both ends of the first spring 3 on the first connecting rods 101, the first spring 3 is prevented from displacement when the second substrate 5 moves relative to the first substrate 2. A suitable distance should be left between the first connecting rod 101 on the first substrate 2 and the first connecting rod 101 on the second substrate 5, in order to prevent any influences to the second substrate 5.

As illustrated in FIG. 1 and FIG. 2, in some embodiments of the present disclosure, the first substrate 2 and the second substrate 5 are parallel to each other and are both rectangular-parallelepiped-shaped plates; the first substrate 2 and the second substrate 5 are flush at the upper end and the lower end respectively (i.e., with the same height); and the dimension of the second substrate 5 in the lateral direction is smaller than the dimension of the first substrate 2 in the lateral direction. The alignment mechanism is provided with two sets of limiting assemblies respectively positioned at the upper end and the lower end of the first substrate 2, and each set of limiting assembly includes two limiting plates parallel to each other. For the convenience of distinction, the limiting plates positioned at the upper end of the second substrate 5 are referred to as first limiting plates 41, and the limiting plates positioned at the lower end of the second substrate 5 are referred to as second limiting plates 42. The two first limiting plates 41 are respectively disposed at the left and right ends proximal to the second substrate 5, and the two second limiting plates 42 are respectively positioned directly below the two first limiting plates 41.

In this implementation, the first connecting plate 21 is provided with the first connecting plates 21 at the upper end and the lower end respectively; and the second connecting plate 25 is provided with the second connecting plates 25 at the upper end and the lower end respectively. The first limiting plates 41 are positioned above the first connecting plates 21 and the second connecting plates 51, wherein the first connecting plates 21 are disposed at the upper end of the first substrate 2, and the second connecting plates 51 are disposed at the upper end of the second substrate 5. The second limiting plates 42 are positioned below the first connecting plate 21 and the second connecting plate 51, wherein the first connecting plates 21 are disposed at the lower end of the first substrate 2, and the second connecting plates 51 are disposed at the lower end of the second substrate 5. The mounting holes in one ends of the first limiting plates 41 connected to the first connecting plates 21 disposed at the upper end of the first substrate 2 are oblong holes, and the mounting holes in one ends connected to the second connecting plates 51 disposed at the upper end of the second substrate 5 are common circular holes. The mounting holes in one ends of the second limiting plates 41 connected to the first connecting plates 21 disposed at the lower end of the first substrate 2 are oblong holes, and the mounting holes in one ends connected to the second connecting plates 51 disposed at the lower end of the second substrate 5 are common circular holes.

Moreover, in this embodiment, the number of first springs 3 is 4, two of which are proximal to the upper end of the second substrate 5 and are positioned directly below the two first limiting plates 41, and the other two of which are proximal to the lower end of the second substrate 5 and are positioned directly below the two first limiting plates 41.

Further, as illustrated in FIG. 1 and FIG. 2, the alignment mechanism in accordance with this embodiment may further include: a third substrate disposed opposite to the second substrate 5; the third substrate 8 is positioned on a side of the second substrate 5 facing away from the first substrate 2; and the third substrate 8 has a surface that faces away from the second substrate 5 and is configured to connect the first connector. The third substrate 8 is connected to the second substrate 5 in such a manner of being able to move laterally relative to the second substrate 5.

It may be understood that when the alignment mechanism is provided with a third substrate 8, and the connector of the charging device is connected to the surface of the third substrate 8 facing away from the second substrate 5. When the third substrate 8 moves towards the left or the right relative to the second substrate 5, the connector of the charging device may be driven to move towards the left or the right. By a synergistic action of the lateral movement of the third substrate 8 relative to the second substrate 5 and the lateral movement of the second substrate 5 relative to the first substrate 2, the positional deviation between the connector of the charging device and the connector of the AGV in the lateral direction may be eliminated. By providing the third substrate 8, on the one hand, the range of the lateral movement of the connector of the charging device may be expanded; and on the other hand, the deformation of the first spring 3 can be reduced, and the service life of the entire alignment mechanism can be improved.

In addition, in some embodiments of the present disclosure, the third substrate 8 and the second substrate 5 are disposed parallel to each other, and thus the range of the lateral movement of the connector of the charging device may be maximized.

In some embodiments of the present disclosure, the third substrate 8 may be connected to the second substrate 5 in the following manner. As illustrated in FIG. 1 and FIG. 2, the alignment mechanism further includes: a slide rail 7 disposed on one of surfaces of the second substrate 5 and the third substrate 8 which face each other, wherein the lengthwise direction of the slide rail 7 is disposed in a lateral direction; and a slider 6 disposed on the other of the surfaces of the third substrate 8 and the second substrate 5 which face each other and mated with the slide rail 7. When the slider 6 slides towards the left or the right along the slide rail 7, the third substrate 8 may move towards the left or the right relative to the second substrate 5. The second substrate 5 may be provided with the slide rails 7 at the upper end and the lower end respectively; and the third substrate 8 may be provided with the sliders 6 at the upper end and the lower end respectively.

In some embodiments of the present disclosure, the sliders 6 may be disposed on the second substrate 5, and the slide rails 7 may be disposed on the third substrate 8.

Nevertheless, in some embodiments of the present disclosure, the sliders may also be disposed on the surface of the second substrate 5 facing away from the first substrate 2, and the slide rails may also be disposed on the surface of the third substrate 8 which faces the second substrate 5.

In specific practice, the slide rails 7 may be rectangular parallelepipeds, and are provided with sliding chutes in the lateral direction respectively on the upper and lower surfaces thereof. The sliders 6 may be rectangular parallelepipeds, each with the surface provided with an opening having a C-shaped section, wherein a surface which face a surface provided with the C-shaped opening is fixed to the surface of the third substrate 8 which face the second substrate 5; and the upper and lower surfaces of the C-shaped opening which face each other are provided with protrusions that are mated with the sliding chutes above.

Further, in the alignment mechanism according to this embodiment, the dimension of the third substrate 8 in the lateral direction may be smaller than the dimension of the second substrate 5 in the lateral direction. At the same time, the alignment mechanism further includes: connecting members fixed to left and right sides of the surface of the second substrate 5 facing away from the first substrate 2 respectively; and second springs 9 positioned at left and right sides of the third substrate 8 respectively, wherein one end of each of the second springs 9 is connected to the corresponding connecting member, and the other end thereof is connected to the third substrate 8.

By adjusting the preload of the second springs 9 on the left and right sides, the third substrate 8 may be positioned in the middle of the second substrate 5 in an initial state; and when the third substrate 8 deviates to the left or right during the engagement of the connectors, the third substrate 8 may be made to reset by the second springs 9 on the left and right. In some embodiments of the present disclosure, the second springs 9 on the left and right are coaxial.

The connecting members may be provided with through holes having an axial direction disposed in the lateral direction, and provided with second connecting rods 102, wherein one ends of the second rod 102 pass through the through holes in the connecting members and are then connected to the third substrate 8, the second springs 9 are sleeved on the second connecting rods 102, and the second connecting rods 102 are movable in the axial direction (i.e. the lateral direction) of the through holes. With the second connecting rods 102, the second springs 9 may be prevented from being displaced.

In this embodiment, the connecting members may have a specific form as follows. The connecting members include third connecting plates 52 perpendicular to the third substrate 8 and disposed in the vertical direction, and fourth connecting plates 53 parallel to the second substrate 5. The fourth connecting plates 53 are fixed to the surface of the second substrate 5 facing away from the first substrate 2, and one end of each of the third connecting plates 52 in the front-rear direction is fixed to the corresponding fourth connecting plate 53. It may be understood that the two third connecting plates 52 on the left and right sides of the third substrate 8 are disposed opposite to each other; and each of the springs has one end fixed to the surfaces of the two third connecting plates 52 which face each other, and the other end fixed to the left end (or the right end) of the third substrate 8. The through holes described above are formed in the third connecting plates 52.

The connecting members may also have the specific form of rectangular parallelepiped shaped or cubic connecting blocks; and the surfaces of the connecting blocks on the left and right sides of the third substrate which face each other are configured to fix the second springs 9.

Further, as illustrated in FIG. 1 and FIG. 2, the alignment mechanism in accordance with this embodiment may further include: a guiding arm 11, wherein a lengthwise direction of the guiding arm 11 is disposed in a front-rear direction. When the alignment mechanism is provided with the third substrate 8 above and related components, a rear end of the guiding arm 11 (i.e., the end of the guiding arm 11 proximal to the third substrate 8) is fixed on the surface of the third substrate 8 facing away from the second substrate 5; and when the alignment mechanism is not provided with the third substrate 8 above and related components, the rear end of the guiding arm 11 (i.e., the end of the guiding arm 11 proximal to the second substrate 5) is fixed on the surface of the second substrate 5 facing away from the first substrate 5. A front end of the guiding arm 11 (i.e., the end of the guiding arm 11 distal from the third substrate 8 or the second substrate 5) is configured to connect the connector of the charging device.

The interaction force between the connector of the charging device and the connector of the AGV may be transmitted to the second substrate 5 and the third substrate 8 by the guiding arm 11 to allow the second substrate 5 and the third substrate 8 to move in corresponding directions, such that the connector of the charging device is driven to move in the corresponding direction to further automatically adapt the connector of the charging device to the position of the connector of the AGV, thereby completing the engagement of the connectors. The AGV may be provided with a guiding component that cooperates with the guiding arm 11 to improve the ability of the alignment mechanism to automatically adapt to the position of the AGV, thereby improving the docking speed of the connectors.

In some embodiments of the present disclosure, when the guiding arm 11 is fixed to the second substrate 5 and the first substrate 2 and the second substrate 5 are parallel to each other, the lengthwise direction of the guiding arm 11 is perpendicular to the second substrate 5; and when the guiding arm 11 is fixed to the third substrate, the second substrate 5 and the third substrate 8 are parallel to each other, and the lengthwise direction of the guiding arm 11 is perpendicular to the third substrate 8.

In order to reinforce the strength of the guiding arm 11, as illustrated in FIG. 1, a ribbed plate 111 may be provided between the guiding arm 11 and a surface fixed thereto.

Figure 3:
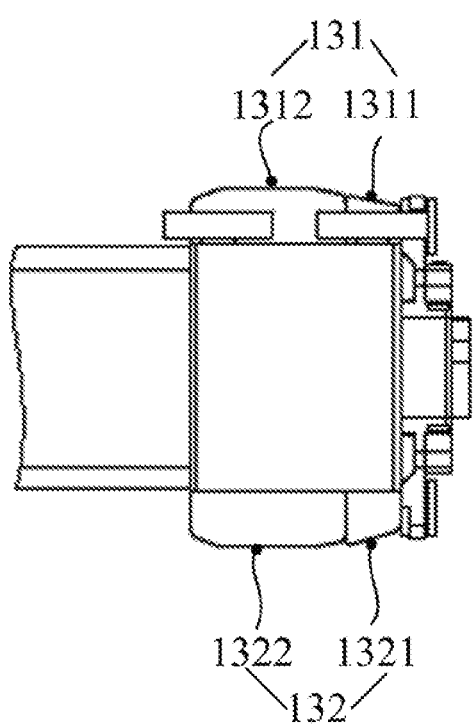
FIG. 3 illustrates a schematic partial structure of a first guiding block and a second guiding block in an alignment mechanism for automatic charging g in accordance with the present disclosure.

Further, as illustrated in FIG. 1 and FIG. 2, the alignment mechanism in accordance with this embodiment may further include: a first guiding block 131 disposed on an upper surface of the guiding arm proximal to the front end of the guiding arm 11, and a second guiding block 132 disposed on a lower surface of the guiding arm 11 and corresponding to the position of the guiding block 131. As illustrated in FIG. 3, an upper surface of the first guiding block 131 includes a beveled segment and a planar segment that are sequentially connected from front to back, wherein the beveled segment of the first guiding block 131 inclines upwards, and a lower surface of the second guiding block 132 includes a beveled segment and a planar segment that are sequentially connected from front to back, wherein the beveled segment of the second guide block 132 inclines downwards. It may be understood that the planar segment 1312 of the first guiding block 131 and the planar segment 1322 of the second guiding block are respectively parallel to the upper and lower surfaces of the guiding arm 11.

With the first guiding block 131 and the second guiding block 132, it is advantageous to move the second substrate 5 upwards and downwards, thereby eliminating the positional deviation between the connector of the charging device and the connector of the AGV.

It should be noted that, when the guiding arm 11 is in the shape of a rectangular parallelepiped, the planar segment 1312 of the first guiding block 131 and the planar segment 1322 of the second guiding block are parallel to the upper and lower surfaces of the guiding arm 11 respectively. The planar segment 1312 of the first guiding block 131 and the planar segment 1322 of the second guiding block are respectively parallel to the upper and lower surfaces of the rectangular parallelepiped. When the guiding arm 11 is in the shape of a cylinder, the planar segment 1312 of the first guiding block 131 and the planar segment 1322 of the second guiding block are parallel to the upper and lower surfaces of the guiding arm 11 respectively. To be specific, the planar segment 1312 of the first guiding block 131 is parallel to the first horizontal plane, the planar segment 1322 of the second guiding block is parallel to the second horizontal plane, and the first horizontal plane and the second horizontal plane are tangent to the upper and lower ends of the outer circumferential surface of the cylinder respectively.

Further, as illustrated in FIG. 1 and FIG. 2, the alignment mechanism according to this embodiment may further include: a first disc 121 and a second disc 122, which are disposed on left and right sides of the front end of the guiding arm 11 respectively, wherein the first disc 121 and the second disc 122 are disposed horizontally (that is the axial direction of the first disc 121 and the second disc 122 is disposed in the up-down direction), a leftmost edge of the first disc 121 has a protrudes outwards relative to a leftmost edge of the guiding arm 11, and a rightmost edge of the second disc 122 protrudes outwards relative to a rightmost edge of the guiding arm 11.

In specific practice, the first disc 121 and the second disc 122 may be bearings.

When the AGV is provided with the guiding member, the edges of the first disc 121 and the second disc 122 protruding outwards relative to the guiding arm 11 move along the guiding member during the docking of the connector of the AGV into the connector of the charging device, which is advantageous to allow the second substrate 5 to move towards the left or the right, thereby eliminating the positional deviation between the connector of the charging device and the connector of the AGV in the lateral direction.

The number of first discs 121 includes, but is not limited to, 2, and when a plurality of first discs 121 are provided, the plurality of first discs 121 are arranged in the front-rear direction. The number of second discs 122 includes, but is not limited to, 2, and when a plurality of second discs 122 are provided, the plurality of second discs 122 are arranged in the front-rear direction.

Further, a connecting shaft may be disposed on the guiding arm 11, and the first disc 121 and the second disc 122 may be sleeved on the connecting shaft (it may be understood that the axis of the connecting shaft is disposed in the up-down direction). The first disc 121 and the second disc 122 are rotatable around the connecting shaft. Thus, the friction occurring when the first disc 121 and the second disc 122 come into contact with other guiding components is rolling friction, which is low in frictional resistance.

Figure 4:
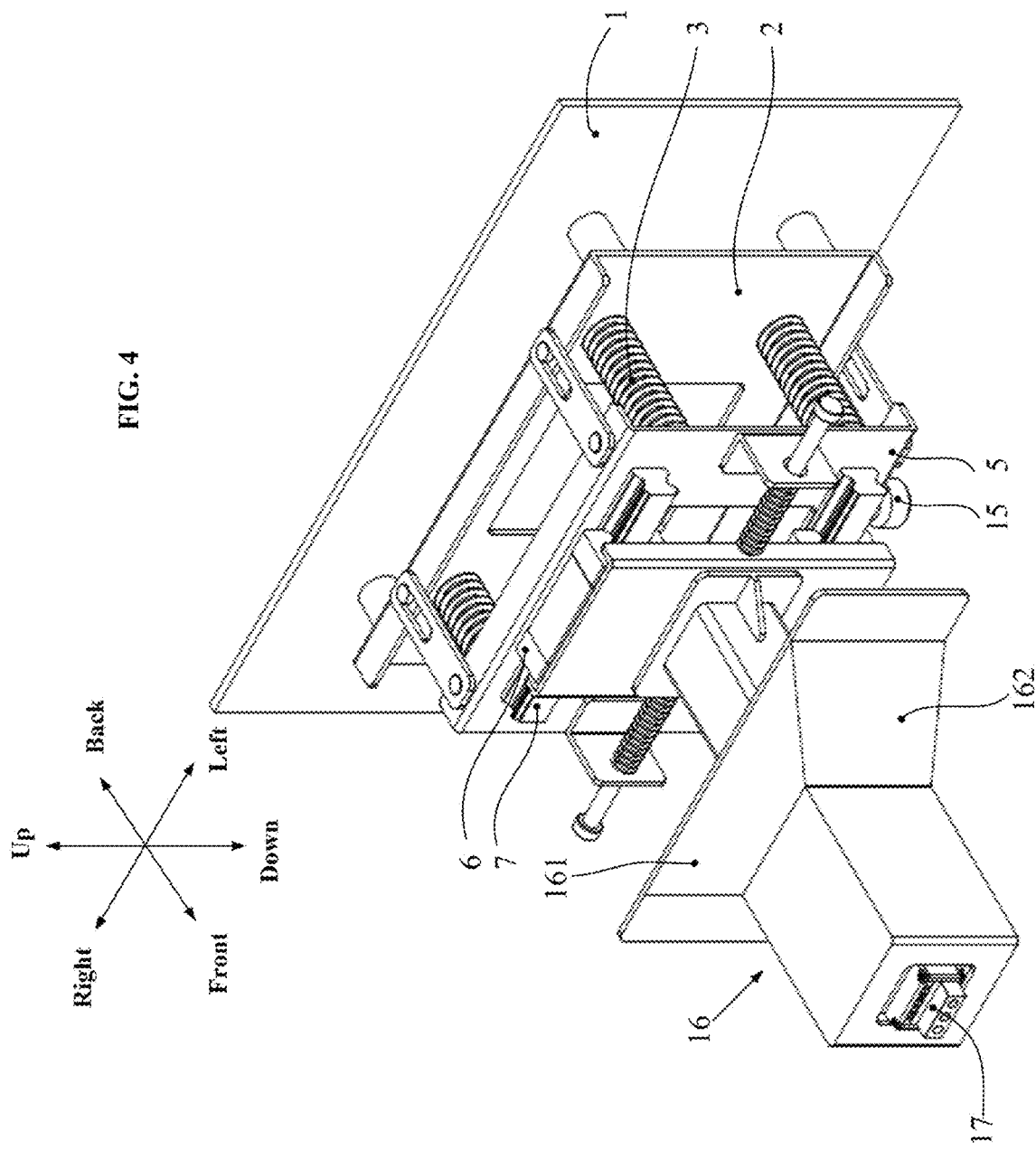
FIG. 4 illustrates a schematic 3D structure of a charging device for automatic charging in accordance with the present disclosure.
Figure 5:
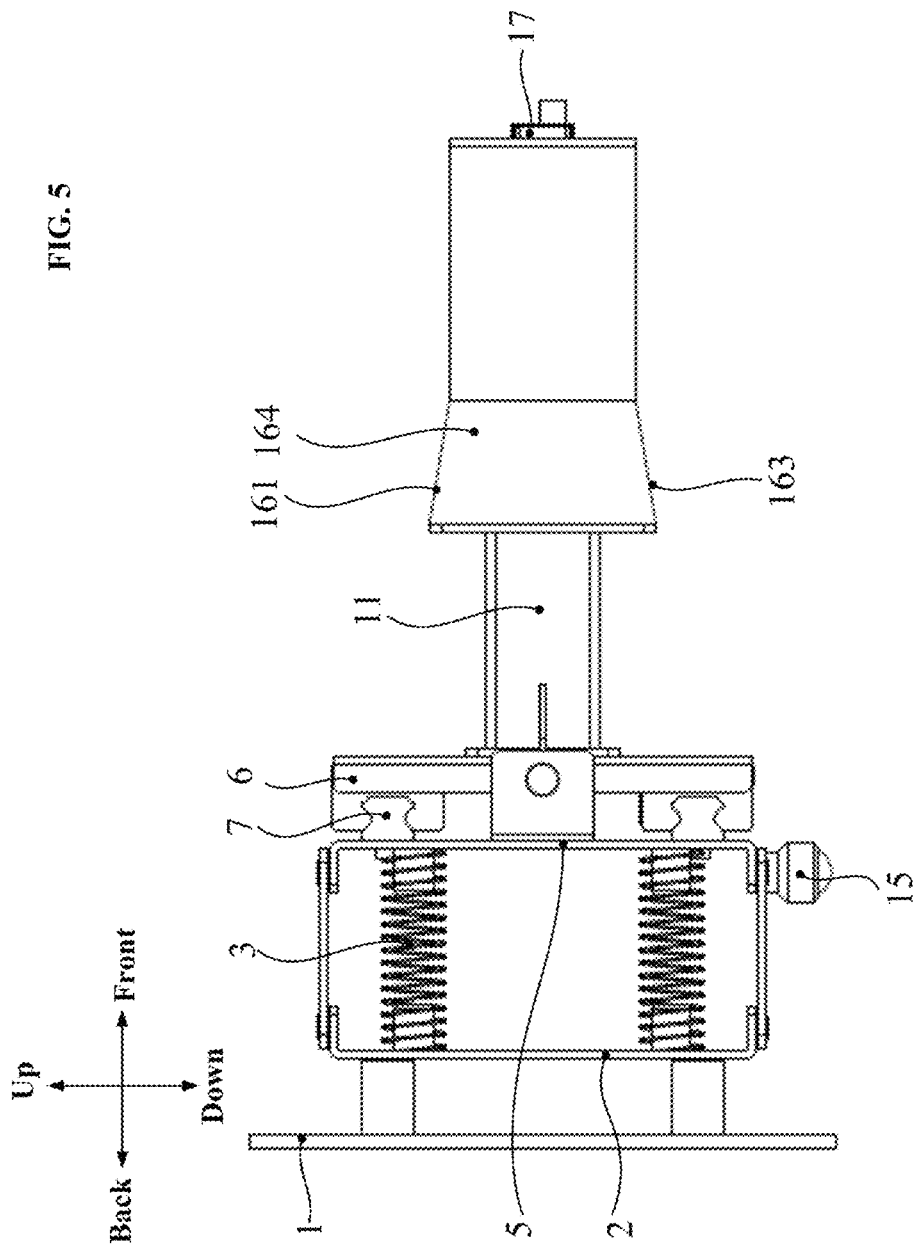
FIG. 5 illustrates a schematic planar structure of a charging device for automatic charging in accordance with the present disclosure.

For example, the guiding component disposed on the AGV may take the form of a guiding barrel 16 as illustrated in FIG. 4 and FIG. 5. The guiding barrel 16 includes a rectangular-parallelepiped barrel having one end fixed to the AGV, and the end is provided with an opening for accommodating the connector of the AGV (i.e., the second connector 17 in FIG. 4 and FIG. 5); and the other end of the barrel is open, and four surfaces of the barrel are connected to an upwards inclined surface 161, a downwards inclined surface 163, a leftwards inclined surface 162, and a rightwards inclined surface 164 respectively.

The inclination of the upwards inclined surface 161 of the guiding barrel 16 cooperates with the inclination of the beveled segment of the first guiding block 131; the inclination of the downwards inclined surface 163 cooperates with the inclination of the beveled segment of the second guiding block 132; the rightwards inclined surface 164 of the guiding barrel 16 cooperates with the edge of the first disc 121 protruding outwards relative to the guiding arm 11; and the leftwards inclined surface 162 cooperates with the edge of the second disc 122 protruding outwards relative to the guiding arm 11. In some embodiments of the present disclosure, the inclination of the leftwards inclined surface 163 and the rightwards inclined surface 164 is greater than the inclination of the upwards inclined surface 161 and the downwards inclined surface 162.

During the docking of the connector of the charging device into the connector of the AGV, the AGV travels backwards, the first guiding block 131 and the second guiding block 132 move towards the interior of the guiding barrel 16 respectively along the upwards inclined surface 161 and the downwards inclined surface 163 of the guiding barrel 16, and the edges of the first disc 121 and the second disc 122, protruding outwards relative to the guiding arm 11, move towards the interior of the guiding barrel 16 respectively along the rightwards inclined surface 164 and the leftwards inclined surface 162 of the guiding barrel 16. By interactions of the first guiding block 131, the second guiding block 132, the first disc 121 and the second disc 122 with the corresponding inclined surfaces of the guiding barrel 16, the second substrate 5 and the third substrate 8 are movable in the corresponding direction, thereby eliminating the positional deviation between the connector of the charging device and the connector of the AGV.

According to the above description of the structure of the alignment mechanism according to this embodiment, it may be seen that the alignment mechanism according to this embodiment may be divided into three units; a first movable unit, including a first substrate 2, a second substrate 5, a first spring 3, limiting plates 4 and related components; a second movable unit, including a third substrate 8, slide rails 7, sliders 6, second springs 9 and related components; and a guiding unit, including a guiding arm 11, a first guiding block 131, a second guiding block 132, a first disc 121, a second disc 122 and related components. The alignment mechanism may be provided with at least one of the three units above according to actual use conditions.

For instance, In some embodiments of the present disclosure, the first movable unit is provided only, and the connector of the charging device is directly fixed on the surface of the second substrate 5 facing away from the first substrate 2. This method is mainly applicable to the case where the connectors are of a surface-contact type, and the AGV has a high control precision with a small positional deviation in the lateral direction.

In some embodiments of the present disclosure, the first movable unit and the second movable unit are provided, and the connector of the charging device is fixed on the surface of the third substrate 8 facing away from the second substrate 5. This method is mainly applicable to the case where the connectors are of a surface contact type, and the AGV has a low control precision with a large positional deviation in the lateral direction.

In some embodiments of the present disclosure, the first movable unit and the guiding unit are provided, the rear end of the guiding arm 11 is directly fixed to the surface of the second substrate 5 facing away from the first substrate 2, and the connector of the charging device is fixed to the front end of the guiding arm 11. This method is applicable to the case where the AGV has a high control precision with a small positional deviation in the lateral direction. This method is applicable to all types of connectors, especially for plug-and-socket type connectors.

In some embodiments of the present disclosure, the first movable unit, the second movable unit and the guiding unit are provided simultaneously, the rear end of the guiding arm 11 is fixed to the surface of the third substrate 8 facing away from the second substrate 5, and the connector of the charging device is fixed to the front end of the guiding arm 11. This method is applicable to the case where the AGV has a low control precision with a large positional deviation in the lateral direction. This method is applicable to all types of connectors, especially for plug-and-socket type connectors.

Further, as illustrated in FIG. 1 and FIG. 2, the alignment mechanism in accordance with this embodiment may further include: a fourth substrate 1 fixed to the surface of the first substrate 2 facing away from the second substrate 5. With the fourth substrate 1, the alignment mechanism becomes more stable as an entirety. The fourth substrate 1 may be disposed in a vertical direction, that is, in parallel with the first substrate 2, or may be disposed at an angle to the first substrate 2. When the alignment mechanism is disposed in the charging device, the first substrate 2 may be fixed by fixing the fourth substrate 1 to the charging device. The charging device typically has a housing, a surface of which may directly serve as the fourth substrate 1. The first substrate 2 and the fourth substrate 1 may be fixed therebetween by a third connecting rod 103.

Further, as illustrated in FIG. 1 and FIG. 2, the alignment mechanism in accordance with this embodiment may further include: a universal ball 15 disposed below the second substrate 5. The universal ball 15 may support the entire alignment mechanism. The number of universal balls 15 includes, but is not limited to, 2. When the second substrate 5 is provided with the second connecting plate 51 at the lower end, the universal ball 15 may be mounted on the lower surface of the second connecting plate 51.

In summary, with the combination of the springs, slide rails, sliders and the like, this embodiment provide an alignment mechanism that may automatically adapt the connector of the charging device to the position of the connector of the AGV during the automatic charging of the AGV. With the alignment mechanism according to this embodiment, when the AGV is to be charged automatically, the AGV may be kept in a backward traveling state to automatically adapt the connector of the charging device to the position of the connector of the AGV by the action of the alignment mechanism, quickly eliminating the positional deviation and angular deviation between the connector of the charging device and the connector of the AGV in the lateral, front-rear and up-down directions, and completing the engagement of the connector of the charging device and the connector of the AGV, such that the automatic charging efficiency is improved and the requirement for the control precision of the AGV is reduced. Moreover, the alignment mechanism according to this embodiment is simple in structure and low in cost.

It may be understood by those skilled in the art that in this embodiment, the working principle of the alignment mechanism according to this embodiment is explained merely with the AGV as an example. The alignment mechanism according to this embodiment is applicable to other movable devices that take the rechargeable battery as a power source and are charged in an automatic charging manner, which include, but not limited to, sweeping robots.

Based on the alignment mechanism for automatic charging, this embodiment further provides a charging device for automatic charging, including: an alignment mechanism and a first connector 14 connected to the alignment mechanism. The alignment mechanism is the one according to the embodiments illustrated in FIG. 1 and FIG. 2 above.

With the adoption of the alignment mechanism according to the embodiments illustrated in FIG. 1 and FIG. 2 above, the automatic charging efficiency may be improved effectively by applying the charging device according to these embodiments to the devices such as the AGV.

According to the description in the embodiments illustrated in FIG. 1 and FIG. 2 above, when the alignment mechanism is provided only with the first movable unit including the first substrate 2, the second substrate 5, the first spring 3, the limiting plates 4 and related components, the first connector 14 is directly fixed on the surface of the second substrate 5 facing away from the first substrate 2; when the alignment mechanism is provided with the second movable unit including the third substrate 8, the slide rails 7, the sliders 6, the second springs 9 and related components, the first connector 14 is fixed on the surface of the third substrate 8 facing away from the second substrate 5; and when the alignment mechanism is provided with the guiding unit including the guiding arm 11, the first guiding block 131, the second guiding block 132, the first disc 121, the second disc 122 and related components, the first connector 14 is fixed to the front end of the guiding arm 11.

It may be understood that the charging device according to this embodiment includes a housing, an electronic control system and other components, in addition to the alignment mechanism and the first connector 14. The specific arrangement of the housing and the electronic control system is not limited in this embodiment, and the conventional arrangement in the art is applicable.

In addition, the present disclosure further provides a charging system for automatic charging. Referring to FIG. 4 and FIG. 5. FIG. 4 illustrates a schematic 3D structure of the charging system in accordance with this embodiment, and FIG. 5 illustrates a schematic planar structure of the charging system in accordance with this embodiment. The charging system includes an alignment mechanism disposed in a charging device, a first connector 14 connected to the alignment mechanism, and a second connector 17 disposed on the AGV and mated with the first connector 14. The alignment mechanism is the one according to the embodiments illustrated in FIG. 1 and FIG. 2 above.

According to the description in the embodiments illustrated in FIG. 1 and FIG. 2 above, when the alignment mechanism is provided only with the first movable unit including the first substrate 2, the second substrate 5, the first spring 3, the limiting plates 4 and related components, the first connector 14 is directly fixed on the surface of the second substrate 5 facing away from the first substrate 2; when the alignment mechanism is provided with the second movable unit including the third substrate 8, the slide rails 7, the sliders 6, the second springs 9 and related components, the first connector 14 is fixed on the surface of the third substrate 8 facing away from the second substrate 5; and when the alignment mechanism is provided with the guiding unit including the guiding arm 11, the first guiding block 131, the second guiding block 132, the first disc 121, the second disc 122 and related components, the first connector 14 is fixed to the front end of the guiding arm 11.

Further, as illustrated in FIG. 4 and FIG. 5, in the case where the alignment mechanism is provided with the guiding unit above, the charging system according to this embodiment further includes: a guiding barrel 16 with one end fixed to the AGV, wherein the end of the guiding barrel 16 fixed to the AGV has an opening for accommodating the second connector 17, and one end of the guiding barrel 16 away from the AGV is open, and has an upwards inclined surface 161, a downwards inclined surface 162, a leftwards inclined surface 163 and a rightwards inclined surface 164 respectively.

For the specific structure of the guiding barrel 16, reference may be made to the description in the embodiments illustrated in FIG. 1 and FIG. 2 above, and the details are not given herein any further.

In the alignment mechanism in accordance with the present disclosure, at least two limiting plates that are parallel to each other and positioned in the same horizontal plane are between the first substrate and the second substrate; and both ends of each of the limiting plates are connected to the opposite surfaces of the first substrate and the second substrate respectively in such a manner that the limiting plate is rotatable in the horizontal plane thereof. Therefore, when an external force acts on the second substrate, the second substrate is movable in the lateral direction relative to the first substrate, and meanwhile, a relative position between the second substrate and the first substrate in the front-rear direction may also change. Hence, during practical application, the alignment mechanism according to the present disclosure is disposed in the charging device, the first substrate is fixed to the charging device, and the connector of the charging device is connected to the second substrate. When there is a deviation in the lateral direction between the connector of the AGV and the connector of the charging device during docking, an interaction force between the connector of the AGV and the connector of the charging device causes the second substrate to move laterally, thereby driving the connector of the charging device to move towards the left or the right and further eliminating the positional deviation between the connector of the AGV and the connector of the charging device in the lateral direction. Then, under cooperation of the first spring which is connected between the first substrate and the second substrate, the connector of the AGV and the connector of the charging device may be adjusted in terms of the positional relationship in the front-rear direction, thereby eliminating the positional deviation in the front-rear direction.

With the alignment mechanism according to the present disclosure, the connector of the charging device may be automatically adapted to the position of the AGV connector, solving the problem of low efficiency in automatic charging caused by repeatedly adjusting the position of the AGV for docking the connector of the AGV into the connector of the charging device in the related art, and docking the connector of the AGV into the connector of the charging device quickly and smoothly, such that the efficiency in automatic charging is improved.

The description above is merely for the purpose of facilitating those skilled in the art to understand the technical solutions of the present disclosure, and is not intended to limit the present disclosure. Within the spirit and principles of the present disclosure, any modifications, equivalent substitutions, improvements and the like shall be considered as falling within the protection scope of the present disclosure.

What is claimed is:

1. An alignment mechanism for automatic charging, comprising:
   a first substrate, disposed in a vertical direction;
   a second substrate, disposed opposite to the first substrate;
   a first spring, both ends connected to surfaces of the first substrate and the second substrate which face each other, respectively; and
   a limiting assembly, disposed between the first substrate and the second substrate,
   wherein the limiting assembly comprises at least two limiting plates which are disposed parallel to each other and are in a same horizontal plane, and each of the two limiting plates has both ends that are connected to the first substrate and the second substrate respectively in such a manner that the limiting plate is rotatable in the horizontal plane thereof;
   wherein a surface of the second substrate facing away from the first substrate is configured to connect a first connector, the first connector being a connector of a charging device;
   wherein the alignment mechanism further comprises:
   a first connecting plate and a second connecting plate, which are disposed on the surfaces of the first substrate and the second substrate which face each other respectively,
   wherein the first connecting plate and the second connecting plate are positioned in the same horizontal plane; and
   wherein one end each of the limiting plates is connected to the first connecting plate by a first pin, and the other end thereof is connected to the second connecting plate by a second pin.

2. The alignment mechanism according to claim 1, wherein the first connecting plate and the second connecting plate are both with a mounting hole; both ends of the limiting plate are also provided with a mounting hole;
   the first pin sequentially passes through the mounting hole in the first connecting plate and the mounting hole at one end of the limiting plate to connect one end of the limiting plate to the first connecting plate; and
   the second pin sequentially passes through the mounting hole in the second connecting plate and the mounting hole at the other end of the limiting plate to connect the other end the limiting plate to the second connecting plate.

3. The alignment mechanism according to claim 2, wherein the mounting hole at at least one of the two ends of the limiting plate is an oblong hole, the oblong hole comprising two arc portions opposite to each other and a linear portion connecting the two arc portions, and a lengthwise direction of the oblong hole being in a front-rear direction; and
   the first pin is movable in the lengthwise direction of the oblong hole, or the second pin is movable in the lengthwise direction of the oblong hole, or the first pin and the second pin are both movable in the lengthwise direction of the oblong hole.

4. The alignment mechanism according to claim 2, wherein a length of the first pins outside the mounting hole of the first connecting plate is greater than a thickness of the limiting plate; and
   a length of the second pins outside the mounting hole of the second connecting plate is greater than the thickness of the limiting plate.

5. The alignment mechanism according to claim 1, wherein the alignment mechanism is with at least two sets of the limiting assemblies, which are arranged in a vertical direction.

6. The alignment mechanism according to claim 1, further comprising:
a third substrate is disposed opposite to the second substrate, wherein the third substrate is positioned on a side of the second substrate facing away from the first substrate, and the third substrate has a surface that faces away from the second substrate and is configured to connect the first connector; and
the third substrate is connected to the second substrate in such a manner that the third substrate is movable laterally relative to the second substrate.

7. The alignment mechanism according to claim 6, further comprising:
a slide rail is on one of two opposite surfaces of the second substrate and the third substrate, wherein the lengthwise direction of the slide rail is disposed in a lateral direction; and
a slider is on the other of the two opposite surfaces of the third substrate and the second substrate and mated with the slide rail.

8. The alignment mechanism according to claim 7, wherein the slide rail is on the second substrate, and the slider is on the third substrate.

9. The alignment mechanism according to claim 6, wherein a dimension of the third substrate in a lateral direction is smaller than a dimension of the second substrate in the lateral direction; and
the alignment mechanism further comprises:
a connecting member fixed to each of left and right sides of the surface of the second substrate facing away from the first substrate respectively; and
two second springs positioned at each of left and right sides of the third substrate respectively, wherein
one end of each of the two second springs is connected to the corresponding connecting member, and another end thereof is connected to the third substrate.

10. The alignment mechanism according to claim 9, wherein the connecting member is provided with a through hole, an axial direction of the through hole being in a lateral direction;
the alignment mechanism further comprises: a second connecting rod, wherein one end of the second connecting rod passes through the through hole in the corresponding connecting member and connected to the third substrate, and the second connecting rod is movable in the axial direction of the through hole; and
the second spring is sleeved on the second connecting rod.

11. The alignment mechanism according to claim 6, further comprising: a guiding arm, wherein
a lengthwise direction of the guiding arm is in a front-rear direction, a rear end of the guiding arm is connected to the surface of the third substrate facing away from the second substrate, and a front end of the guiding arm is configured to connect the first connector.

12. The alignment mechanism according to claim 1, further comprising: a guiding arm, wherein
a lengthwise direction of the guiding arm is in a front-rear direction, a rear end of the guiding arm is connected to the surface of the second substrate facing away from the first substrate, and a front end of the guiding arm is configured to connect the first connector.

13. The alignment mechanism according to claim 12, further comprising:
a first guiding block is on an upper surface of the guiding arm proximal to the front end of the guiding arm, and a second guiding block is on a lower surface of the guiding arm and corresponding to the position of the guiding block, wherein
an upper surface of the first guiding block comprises a beveled segment and a planar segment that are sequentially connected from front to back, the beveled segment of the first guiding block inclining upwards; and
a lower surface of the second guiding block comprises a beveled segment and a planar segment that are sequentially connected from front to back, the beveled segment of the second guide block inclining downwards.

14. The alignment mechanism according to claim 12, further comprising:
a first disc and a second disc that are on left and right sides of the front end of the guiding arm respectively;
wherein the first disc and the second disc are horizontally;
a leftmost edge of the first disc protrudes outwards relative to a leftmost edge of the guiding arm; and
a rightmost edge of the second disc protrudes outwards relative to the rightmost edge of the guiding arm.

15. The alignment mechanism according to claim 1, further comprising: a fourth substrate fixed to the surface of the first substrate facing away from the second substrate.

16. The alignment mechanism according to claim 1, further comprising: a universal ball below the second substrate.

17. A charging device for automatic charging, comprising: an alignment mechanism and a first connector connected to the alignment mechanism;
wherein the alignment mechanism is the alignment mechanism as defined in claim 1.

18. A charging system for automatic charging, comprising: an alignment mechanism is in a charging device, a first connector connected to the alignment mechanism, and a second connector is on an automated guided vehicle and mated with the first connector;
wherein the alignment mechanism is the alignment mechanism as defined in claim 1.

19. The charging system according to claim 18, further comprising: a guiding cylinder with one end fixed to the automated guided vehicle, wherein
an end of the guiding cylinder fixed to the automated guided vehicle is provided with an opening for accommodating the second connector; and
one end of the guiding cylinder distal from the automated guided vehicle is open, and an area of a cross section of the guiding cylinder which is close to the automated guided vehicle is less than an area of a cross section of the guiding cylinder which is far away from the automated guided vehicle.

* * * * *